Figure 1:
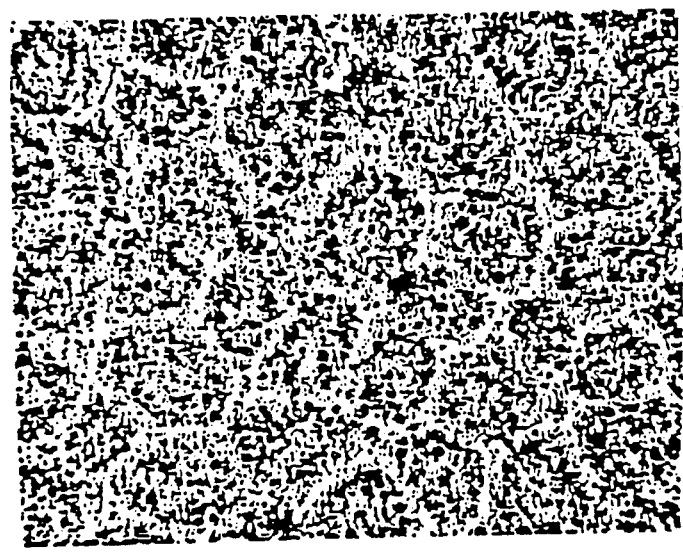

United States Patent [19]

Hermann et al.

[11] Patent Number: 4,968,473
[45] Date of Patent: Nov. 6, 1990

[54] PROCESS FOR THE PRODUCTION OF CERAMIC GREEN FILMS

[75] Inventors: Hans D. Hermann, Bad Soden am Taunus; Dieter Grote, Marktredwitz; Karl Waldmann, Bad Soden am Taunus, all of Fed. Rep. of Germany

[73] Assignee: Hoechst AG, Fed. Rep. of Germany

[21] Appl. No.: 281,200

[22] Filed: Dec. 7, 1988

[51] Int. Cl.$^5$ .............................................. C04B 33/28
[52] U.S. Cl. ..................... 264/300; 264/63; 264/299
[58] Field of Search ........................ 264/63, 300, 299

[56] References Cited

U.S. PATENT DOCUMENTS 2,966,719  1/1961  Park ................................. 264/63
4,353,958  10/1982  Kita .................................. 264/63

*Primary Examiner*—James Derrington
*Attorney, Agent, or Firm*—Bierman and Muserlian

[57] ABSTRACT

Ceramic green films having advantageous isotropic distribution of the inorganic pigment can be obtained by casting and drying a slip containing finely divided inorganic pigment, organic solvents, polyvinylbutyral, plasticizer and dispersing agent if compounds which contain in their molecules at least one structural unit of the formula Z

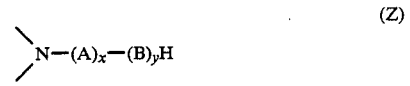

in which A and B, which must be different, stand for either the oxyalkylene unit —$C_{3\text{-}4}H_{6\text{-}8}O$— or the oxyalkylene unit —$C_2H_4O$— and x and y, which can be identical or different, each denote a number from 1 to 200, are used as dispersing agents.

Ceramic green films produced according to the invention can be converted to isotropic ceramic substrates by subsequent heat treatment and sintering.

6 Claims, 1 Drawing Sheet

PROCESS FOR THE PRODUCTION OF CERAMIC GREEN FILMS

The invention relates to the production of ceramic green films by casting and drying a slip containing finely divided inorganic pigment, organic solvents, polyvinylbutyral, plasticizer and dispersing agent, it being possible, by using specific dispersing agents according to the invention, to obtain ceramic green films which have surprisingly advantageous properties and can be converted into isotropic ceramic substrates by subsequent heat treatment.

Substrates of ceramic composition, for example of aluminum oxide, can be produced by casting so-called slips. A slip is understood here as a slurry of inorganic pigments in an organic solvent containing a polymeric binder, such as polyvinylbutyral, and a plasticizer, such as, for example, a phthalic acid ester. This slip is poured onto a continuously running belt of metal or plastic, a constant layer thickness of the casting composition being established by means of a doctor blade. The slip is dried on the belt and a flexible green film is formed, which can be peeled off from the belt continuously. The green film can easily be further processed by cutting and stamping. The organic constituents are then evaporated off from the film by a particular temperature program, and the film is then sintered at high temperatures to give the substrate.

However, this economic process has a number of disadvantages, of which only a few particularly serious ones will be singled out here.

After drying, the green film tends to stick to the belt, especially to a metal belt. So much force is necessary to peel it off from the belt that the film is stretched. It is known that the belt can be treated with a lubricant, which means that the adhesion of the film is reduced—although often not sufficiently.

When casting the slip, shearing effects occur to a greater or lesser degree. This means that non-spherical inorganic particles, for example commercially available aluminum oxide, are orientated in the direction of flow. This orientation is intensified further if the organic solvent/binder/plasticizer system as such is not homogeneous but consists of several phases and if the particle size distribution of the inorganic pigments is high.

All the effects described generally mean that during burning and sintering of the substrates, different shrinkages which cannot be established reproducibly arise along and at right angles to the direction of flow.

Another serious disadvantage is the tendency of inorganic articles to settle together in an uncontrollable manner even before drying. Small hollow spaces form in the particle aggregates, i.e. the particles are not densely packed to the optimum. This in turn causes a high and poorly reproducible shrinkage of the green films during burning, and anisotropies form in the resulting ceramic substrate. Overall, the effects described mean that it is not possible to produce substrates with precise dimensions by the casting process. To produce precision components, it is therefore necessary, inter alia, to cut ready-burned subtrates in expensive processes, for example with laser beams.

There has so far been no lack of attempts to reduce the problem of non-uniform shrinkage and of formation of substrate anisotropies. It has become widely known, inter alia, that it is necessary to achieve better dispersion of the inorganic particles. Thus, particle aggregates are destroyed by grinding the slip for several days, but aggregates of non-optimum density are again formed during casting It is more advantageous to add dispersing agents, such as fish oil, polyethylene glycols or ethylene oxide/propylene oxide block copolymers, and to use polymers having good dispersing properties as binders, such as, for example, polyvinylbutyral or acrylate copolymers, in which case the requirement that the organic compounds used can be removed completely from the green film must of course be met. It has been possible to achieve noticeable improvements in the dimensioning of substrates by such methods, so that the casting process has become acceptable worldwide. Nevertheless, it is still not possible to produce substrates with exact dimensions by the casting process. This is on the one hand because, for example when using fish oil or other unsaturated fatty acid esters, although low-viscosity slips can rapidly be prepared, the primary particles cannot be kept free from aggregates, or because the dispersing agents used do not form a homogeneous phase with the solvent, the binder and plasticizer. It is often also necessary to use the additives in such high concentrations that burning off of the organic constituents from the green film is considerably impeded.

It has now been found, surprisingly, that the disadvantages mentioned can be overcome if compounds which contain in their molecules at least one structural unit of the formula Z

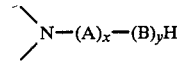   (Z)

in which A and B, which must be different, stand for either the oxyalkylene unit $-C_{3-4}H_{6-8}O-$ or the oxyalkylene unit $-C_2H_4O-$ and x and y, which can be identical or different, each denote a number from 1 to 200, preferably 2 to 50, are used as dispersing agents in a binder system consisting of organic solvents, polyvinylbutyral, plasticizer and dispersing agent.

The invention thus relates to a process for the production of ceramic green films by casting and drying a slip containing finely divided inorganic pigment, organic solvents, polyvinylbutyral, plasticizer and dispersing agent, which comprises using compounds which contain in their molecules at least one structural unit of the formula Z

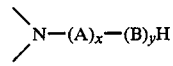   (Z)

in which A and B, which must be different, stand for either the oxyalkylene unit $-C_{3-4}H_{6-8}O-$ or the oxyalkylene unit $-C_2H_4O-$ and x and y, which can be identical or different, each denote a number from 1 to 200, preferably 2 to 50, as dispersing agents.

In one embodiment of the invention, the structural unit of the formula Z corresponds to the formula $Z^1$ or $Z^2$

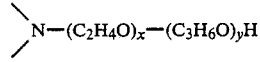   ($Z^1$)

-continued

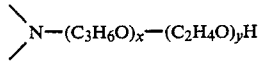
(Z²)

in which x and y in each case have the meanings as in formula Z.

As the formulae Z¹ and Z² which correspond to the basic formula Z show by way of example, the groups A and B therein represent the oxyalkylene units —$C_3H_6O$— or —$C_2H_4O$—, A and B not being identical, i.e. the groups A and B in formula Z together always form block copolymer structures, or represent block copolymer adducts.

In a preferred embodiment of the invention, the dispersing agent according to the invention corresponds to the formulae I and/or II

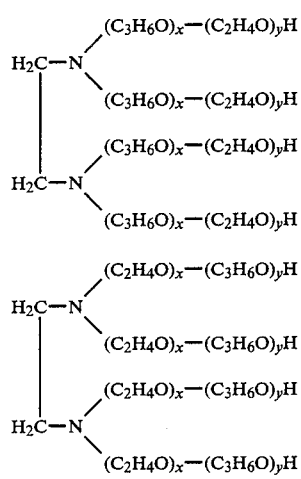

in which x and y in each case have the meanings as in formula Z.

The invention furthermore relates to ceramic green films produced by casting and drying a slip containing finely divided inorganic pigment, organic solvents, polyvinylbutyral, plasticizer and, as dispersing agent, compounds which contain at least one structural unit of the formula Z in their molecules.

The invention furthermore relates to ceramic substrates produced from ceramic green films, obtained according to the invention, by heat treatment and sintering, preferably by heating and sintering at temperatures of at least 1600° C.

In another embodiment of the invention, the dispersing agent according to the invention contains compounds which can be prepared by addition of one or more radicals of block copolymer structure of x ethylene oxide units and y propylene oxide units or x propylene oxide units and y ethylene oxide units, x and y in the radicals of block copolymer structure having the meanings as in formula Z, onto the amino groups of primary or secondary amines, preferably aliphatic amines, having amino-N atoms substituted by aliphatic ($C_1$-$C_{18}$)-radicals, or of primary or primary/secondary or secondary di- or polyamines, preferably aliphatic di- or polyamines having amino-N atoms substituted by aliphatic ($C_1$-$C_{18}$)-radicals or amino-N atoms bonded to one another by multivalent aliphatic ($C_1$-$C_{12}$)-radicals, in particular di- or polyamines having 2 to 4 primary and/or secondary amino groups, it also being possible for the amines or di- or polyamines mentioned additionally to contain tertiary or quaternary-substituted N atoms and/or other substituents.

In a preferred embodiment of the invention, furthermore, the dispersing agent according to the invention contains compounds which can be prepared by addition of four radicals of block copolymer structure of x ethylene oxide units and y propylene oxide units or x propylene oxide units and y ethylene oxide units, x and y in the radicals of block copolymer structure having the meanings as in formula Z, onto the amino groups of ethylenediamine.

The dispersing agents according to the invention have a good to outstanding dispersing action. The inorganic particles dispersed according to the invention are present in the slip as primary particles which do not aggregate prematurely, even when the slip is dried, and which are orientated only little, if at all, during casting, so that isotropic green films of optimum density and therefore optimum packing density of the inorganic particles are obtained.

In contrast to most dispersing agents known for the preparation of ceramic slips, the compounds according to the invention are compatible with polyvinylbutyral and the customary solvents and plasticizers, so that the pigmentfree organic phase gives completely clear films.

The dispersing agents according to the invention furthermore reduce the adhesion of the green films to the casting belt, so that no drawing or stretching occurs when the films are peeled off.

On the basis of the properties described, by using the dispersing agents according to the invention it is possible to produce green films which have a lower shrinkage coupled with an unusually small difference between longitudinal and transverse shrinkage. It is thus possible for substrates of unusually accurate dimensions to be produced reproducibly by the casting process.

The dispersing agents to be used according to the invention are, in particular, known compounds having one or more of the structural units

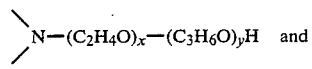 and

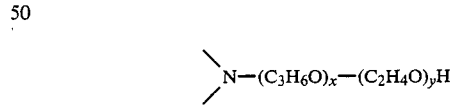

in which x and y in each case have the meanings as in formula Z.

In principle, all the block-like or block copolymer adducts of propylene oxide and ethylene oxide on any desired primary and/or secondary amines are suitable. However, the adducts on primary and secondary aliphatic mono-, di- and polyamines, such as, for example, ethyl-, butyl-, octyl-, dodecyl-, stearyl- and oleylamine, diethylamine, methylstearylamine, ethylenediamine, 1,6-hexylenediamine, diethylenetriamine and triethylenetetramine, are to be preferred.

The adducts on ethylenediamine of the formula Z³

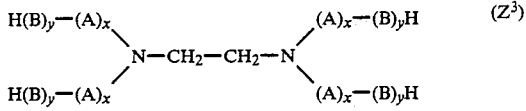

in which A, B, x and y have the meanings as in formula Z, are particularly preferred.

The dispersing agents according to the invention have a whole series of advantages over the preparation of ceramic slips with known dispersing agents.

1. They have a very good dispersing action and in this way prevent agglomeration of the primary inorganic pigment particles in the slip.
2. They are compatible both with polyvinylbutyral and with the customary plasticizers of polyvinylbutyral. They therefore have an additional plasticizing action in the homogeneous systems of polyvinylbutyral/plasticizer/dispersing agent, so that the concentration of the customary plasticizer can be decreased. This in turn favors drying of the green film and removal of the organic constituents from the green film by heating.
3. They reduce the adhesion of the green film to any desired substrates.
4. They reduce the tendency towards foaming in the slip.
5. They enable the homogeneity of the green film to be improved and ensured.
6. They allow combined improvement of the dispersing, antiadhesion and antifoaming action.

To be able to realize this combination of advantages with a single class of substance is exceptionally surprising and was not predictable to the expert. The advantages mentioned - dispersing action, compatibility and antiadhesion and antifoaming action - are pronounced to different degrees in the individual representatives of the compounds to be claimed according to the invention. In general, the rule that the best dispersing action is achieved when oxypropylene blocks sit on the outside of the molecule (B in the above formula $Z^3$) and are relatively large can be applied quite roughly. Conversely, compounds with oxyethylene blocks on the outside of the molecule have a particularly good antiadhesion and antifoaming action. In a preferred embodiment of the invention, two or more compounds according to the invention with different degrees of activities, for example dispersing and anti-adhesion action, are thus combined with one another.

The concentration of the compounds to be used according to the invention can vary within wide limits. In principle, it is desirable to use as little dispersing agent as possible, so that casting and drying of the slip is not impeded. On the other hand, it is necessary for the inorganic particles to be dispersed completely and to the optimum, which in turn depends on their nature and their size or their surface. Similar comments apply to the required reduction in the adhesion of the green film to the casting belt. Finally, as mentioned, attention must also be paid to the compatibility of the entire binder system. The optimum concentration of dispersing agent can be determined, however, by the expert with the aid of the rules mentioned and the test methods described below. In general, the dispersing agents or dispersing agent mixtures according to the invention are used in concentrations of between 0.1 and 10% by weight, based on the inorganic pigment. A preferred range is between 0.2 and 5% by weight. Concentrations of between 0.4 and 3% by weight are particularly preferred.

The commercially available polyvinylbutyrals can be used as binders. These polyvinylbutyrals have viscosities, measured on their 5% strength by weight solutions in ethanol at 23° C., of between 3 and 100 mPa.s. Polyvinylbutyrals or polyvinylbutyral mixtures having viscosities of between 5 and 20 mPa.s are preferably suitable. The commercially available polyvinylbutyrals are terpolymers which, in addition to vinylbutyral units, contain about 0.5 to 3% by weight of vinyl acetate units and 12 to 28% by weight of vinyl alcohol units. The vinyl alcohol units in particular have a substantial influence on the solubility and the mechanical and rheological properties of the polyvinylbutyrals. In the present use, the compatibility with the plasticizer and dispersing agent on the one hand and the mechanical properties on the other hand are of particular importance. Polyvinylbutyrals containing between 15 and 22% by weight of vinyl alcohol units are particularly preferred for optimum adjustment of these properties.

The concentration of binder has a substantial influence on the strength and processability of green films. Films containing too little binder are of low strength and brittle, and too much binder makes it difficult to remove the organic constituents from the green film by heating and can lead to cracking in the substrate. Polyvinylbutyral concentrations of between 2 and 10% by weight, based on the inorganic pigments, are in general used. A preferred range is between 3 and 6% by weight.

The presence of a plasticizer cannot be dispensed with in the production of green films containing polyvinylbutyral as the binder. Plasticizer-free green films are not flexible enough and are brittle.

The ratio of plasticizer/binder determines the flexibility of the film. Increasing plasticizer concentrations improve the extensibility of the film, and the strength increases as the plasticizer content decreases. A condition is, however, that the plasticizer/binder system is homogeneous, i.e. a single phase. All plasticizers which meet this requirement are in principle suitable, i.e. those which are compatible with polyvinylbutyral. Examples of particularly suitable plasticizers are esters of dicarboxylic acids, such as phthalic acid, adipic acid and sebacic acid, with aliphatic or aliphatic-aromatic alcohols, such as dibutyl, dihexyl or dioctyl phthalate, butyl benzyl phthalate, dioctyl adipate or dibutyl sebacate, and furthermore, if appropriate, the corresponding esters of phosphoric acid. Esters of monocarboxylic acids with polybasic alcohols, such as, for example, the esters of triethylene glycol with aliphatic monocarboxylic acids having 6 to 8 carbon atoms, are furthermore suitable. Ethers of long-chain alcohols, such as, for example, the mono-isotridecyl ether of triethylene glycol, are also suitable.

Since they are compatible with polyvinylbutyral, the dispersing agents to be used according to the invention also in principle act as plasticizers which are suitable for increasing the flexibility of the green films. For this reason, the dispersing agent can also at least partly replace the abovementioned non-dispersing plasticizers. The concentration of non-dispersing plasticizer is therefore between 0 and 200% by weight, based on the polyvinylbutyral used. A preferred range is between 10 and 150% by weight, the upper limit of the plasticizer concentration being imposed by the start of incompatibility.

The customary solvents are used to prepare the slip. These are, in particular, alcohols, such as methanol and ethanol, halogenohydrocarbons, such as trichloroethylene, ketones, such as methyl ethyl ketone or methyl isobutyl ketone, and aromatic hydrocarbons, such as toluene or xylene. Mixtures of these solvents are also often used.

The solvent primarily influences the viscosity of the slip and the rate of drying of the green film. The concentration of the solvent is not critical and is within the customary limits, preferably between 20 and 100 parts by weight of solvent, in particular 30 and 50 parts by weight, per 100 parts by weight of inorganic pigment.

All pigments which are suitable for the casting process can in principle be used in the process according to the invention. For the intended use according to the invention, they can have been prepared or further processed in any desired manner, for example by dry or wet grinding. However, to prepare a readily dispersible inorganic pigment, it may be advantageous, for example, for the pigment to be dried, after wet grinding, in the presence of a dispersing agent to be used according to the invention.

As already mentioned, many finely divided inorganic pigment powders are suitable, such as, for example, the oxides of aluminum, magnesium and silicon, barium titanate, silicon, silicon carbide, quartzes, alumosilicates, mixtures of such products and others. The dispersing agents to be used according to the invention are particularly suitable for the production of substrates based on aluminum oxide.

In addition to the constituents mentioned, the slip can also contain other additives, such as flow control agents and stabilizers, which, like the other organic compounds contained in the slip, should be compatible with the binder system. However, it is also possible to use other organic processing auxiliaries which are not compatible with the organic phase and are incorporated in the green film in a finely divided and inert form. Such additives, for example so-called liquefiers, such as fish oil or other fatty acid esters, can facilitate liquefaction of the slip during preparation. However, they should not interfere with the continuity of the binder phase and not impair the dispersing action of the compounds according to the invention. The concentration should therefore not exceed, where appropriate, 2% by weight, preferably 1% by weight, based on the pigment used.

The slips are prepared and processed by customary methods, for example by grinding the pigment, pretreated and if appropriate comminuted in the customary manner, in organic solvents, it being possible to add the binder, plasticizer, dispersing agent and other additives in any desired sequence. However, early addition of the dispersing agent and if appropriate the liquefier and relatively late addition of the binder is to be preferred. The finished slip is applied to a continuously running belt with the aid of a casting shoe and a doctor blade, dried and peeled off. The green film can then be further processed in the customary manner. For example, the aluminum oxide green film can be used for the production of strip conductors, insulators, supports for silicon chips, supports for electronic circuits etc.

Various test methods are suitable for characterizing the organic binder system, and these are described below under (A) to (G).

(A) Checking the homogeneity of the organic binder system.

The organic components in the composition envisaged for preparation of the slip are spread with a doctor blade on a clean glass plate in a wet film thickness of 0.2 mm. After a drying time of at least 24 hours at room temperature, the film is examined under a microscope at a magnification of about 200 with incident light from the side. No deposition of a second phase should be detectable (in the absence of the inert additives mentioned above as liquefiers). When the film is folded into a loop and stored at 23° C. in 100% relative atmospheric humidity for 3 days, no deposition should be detectable on the inside of the loop.

(B) Testing the dispersing power

The dispersing power of a dispersing agent is likewise determined in the organic solution which is to be used for preparing the slip—but in the absence of the binder. 0.1 part by weight of pigment having an average particle size of about 0.5 μm and a narrow particle size distribution (for example Kronos titanium dioxide RN 56) is shaken vigorously in the organic solution in a 10 parts by weight solution in the presence of glass beads for 3 hours. The slower the dispersed pigment settles, the better the dispersing action. The dispersing action is satisfactory if the pigment has only partly settled after standing for 20 hours, and it is good if only a small amount of the pigment has settled within this period. When a dilute pigment slurry is examined under the microscope after having been prepared in the manner described, only few pigment aggregates, if any, should be detectable.

A good dispersing action can also be detected indirectly during production of the substrates. If two green films contain the same inorganic constituents and the same amount of different binder systems, the film with better dispersion has a higher density and lower shrinkage during sintering to the substrate than the film with inorganic particles which are dispersed less well.

(C) Testing the adhesion capacity

As with checking of the homogeneity (test method A), a film is spread with a doctor blade onto a clean glass plate (object slide) and dried for 24 hours. The adhesion is "very slight" if the film can be peeled off, using tweezers, from an object slide which has dimensions of about 25×76×1 mm and lies with its underside loosely on a substrate, without the object slide having to be held. The adhesion is "slight" if a 6 cm wide film can be peeled off from a glass plate having dimensions of 100×300×3 mm in a corresponding manner. The adhesion is "moderate" if the glass plate has to be held during peeling off, but the film is not greatly stretched during this process. The adhesion is "high" if the film is stretched, and it is "very high" if the film cannot be peeled off without damage.

When a green film is spread by a doctor blade onto a clean glass plate in a wet film thickness of 200 μm, after drying it can "easily" be peeled off if this is done without effort and without the film tearing at any point.

(D) Testing the viscosity

The viscosity of the slip or of the organic solutions can be measured with customary viscometers using the Höppler system or the Brookfield system.

(E) Testing the strength and extension

The testing of the tensile strength and tensile strain of pigment-free films and of green films can also be carried out using commercially available machines. A machine of the Instron type was used to test the green films. Strips of film 0.5 to 0.8 mm thick and 15 mm wide were torn at a rate of 5 mm/min at a clamping length of 50 mm.

(F) Test for orientation

Orientation can be detected macroscopically or microscopically on pigment-free films or on films containing only little, i.e. not more than 1% by weight, pigment by streaking, alignment of the pigments or the formation of structures aligned in the casting direction. A corresponding investigation is not conclusive on green films. On these films, orientation can best be detected by the different shrinkage along and at right angles to the casting direction during burning of the green film and sintering to give the substrate.

(G) Testing the foaming properties

The tendency towards foam formation in the organic binder system can best be determined in the absence of inorganic pigments. In this procedure, a sample is shaken in a defined manner and the collapse of the foam formed on the surface is observed in comparison with a standard sample.

The invention is illustrated in more detail by the following examples.

Example 1

A solution was prepared from 10 parts by weight of polyvinylbutyral, 61.5 parts by weight of trichloroethylene, 25 parts by weight of anhydrous ethanol and 3.5 parts by weight of bis-2-ethylhexyl phthalate (DOP). The polyvinylbutyral used had a content of vinyl alcohol units of 18% by weight and a viscosity of 12 mPa.s, measured on a 5% strength by weight solution in ethanol at 23° C. 0.15 g portions of one of the dispersing agents shown in Table 1 from the substance classes of the formula I or II (=dispersing agent (a) or (b)), in which x and y denote the figures shown in Table 1, were added to 10 g portions of this solution. The solutions were shaken vigorously in small bottles for 5 minutes and the foam formation was evaluated as described above under test method (G). The solutions were also spread with a doctor blade onto glass plates in a wet film thickness of 200 μm. The dried films were examined for homogeneity under the microscope as described above for test method (A). The experimental results can be seen from the following Table 1.

TABLE 1

(a) Dispersing agent of the formula I:

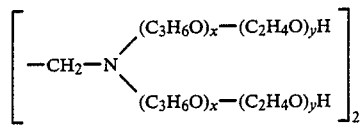

(b) Dispersing agent of the formula II:

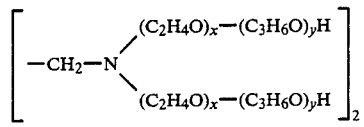

| Experiment No. | Dispersing agent | x | y | Homogeneity of the film produced from the organic binder system | Foam formation of the liquid organic binder system |
|---|---|---|---|---|---|
| 1 | (a) | 12 | 7 | homogeneous | slight |
| 2 | (a) | 15 | 2.5 | homogeneous | very slight |
| 3 | (a) | 25 | 7 | homogeneous | very slight |
| 4 | (a) | 30 | 4 | homogeneous | very slight |
| 5 | (a) | 30 | 15 | homogeneous | slight |
| 6 | (b) | 15 | 7.5 | homogeneous | slight |
| 7 | (b) | 7.5 | 7.5 | homogenous | very slight |

Comparison Example 1

Example 1 was repeated with the modification that the customary additives shown in Table (1a) were used instead of the dispersing agents (a) and (b) according to the invention. Testing was carried out analogously to Example 1. The experimental results can be seen from the following Table (1a).

TABLE 1a

| Experiment No. | Additive | Homogeneity of the film produced from the organic binder system | Foam formation of the liquid organic binder system |
|---|---|---|---|
| 1 | Menhaden fish oil | Deposition of droplets | slight |
| 2 | $C_4H_9O(C_3H_6O)_{12}H$ | Deposition of droplets | slight |
| 3 | $HO(C_2H_4O)_4-(C_3H_6O)_8-(C_2H_4O)_4H$ | homogeneous | severe |

Example 1 shows that the dispersing agents according to the invention are compatible with polyvinylbutyral and plasticizer and cause little foam formation, whereas the known additives according to Comparison Example 1 lead to disadvantages.

Example 2

Portions of 0.1 part by weight of the pigment Kronos titanium dioxide RN 56 were dispersed, as described above under test method (B) in portions of 10 parts by weight of a solution of 68 parts by weight of trichloroethylene, 27.5 parts by weight of anhydrous ethanol and 4.5 parts by weight of DOP, the various amounts shown in Table 2 of the dispersing agents also mentioned in Table 2 having been added to portions of 10 parts by weight of the solution. The dispersing agents (a) (=dispersing agent of the formula (I) and (b) (=dispersing agent of the formula (II) according to the invention, described in Example 1, x and y in formulae I and II denoting the numbers shown in Table 2, were used as dispersing agent. The dispersing action was evaluated from the settling rate and observation of the aggregate formation, as described above under test method (B). The experimental results can be seen from the following Table 2.

TABLE 2

| Experiment No. | Dispersing agent | x | y | Dispersing action with 0.1 part by weight dispersing agent added | 0.2 parts by weight dispersing agent added |
|---|---|---|---|---|---|
| 1 | (a) | 12 | 7 | satisfactory | good |
| 2 | (a) | 25 | 13 | satisfactory | satisfactory |
| 3 | (a) | 25 | 25 | satisfactory | good |
| 4 | (a) | 30 | 4 | still satisfactory | satisfactory |
| 5 | (b) | 15 | 7.5 | good | good |
| 6 | (a) + (b) | (a) 30 (b) 15 | (a) 4 (b) 7.5 | good | good |
| 7 | no dispersing agent added | | | none | none |

Comparison Example 2

Example 2 was repeated with the modification that the additives which are shown in Table (2a) and are customary for influencing dispersion were used instead of the dispersing agents (a) and (b) according to the invention. Testing was carried out analogously to Example 2. The experimental results can be seen from the following Table (2a).

TABLE 2a

| Experiment No. | Dispersing agent | Dispersing action with 0.1 part by weight dispersing agent added | 0.2 parts by weight dispersing agent added |
|---|---|---|---|
| 1 | $C_4H_9O(C_3H_6O)_{12}H$ | poor | poor |
| 2 | $C_{13}H_{27}O(C_2H_4O)_3H$ | poor | poor |
| 3 | $\left[-CH_2-N\begin{matrix}C_3H_6OH\\C_3H_6OH\end{matrix}\right]_2$ | poor | poor |

Example 2 shows that the dispersing agents according to the invention have a superior dispersing action in comparison with customary dispersing agents based on ethylene oxide adducts or propylene oxide adducts of Comparison Example 2.

Example 3

A solution was prepared from 10 parts by weight of polyvinylbutyral, 60.5 parts by weight of trichloroethylene, 24.5 parts by weight of anhydrous ethanol, 1.0 parts by weight of methoxypropyl acetate and 4.0 parts by weight of dibutyl phthalate. The polyvinylbutyral used contained 19.2% by weight of vinyl alcohol units and had a viscosity of 9 5 mPa.s, measured in a 5% strength by weight solution in ethanol at 23° C. 0.1 g portions of one of the dispersing agents (a) or (b) of substance classes of the formula I or II (=dispersing agent (a) or (b)) shown in Table 1, in which x and y denote the numbers shown in Table 3, or a combination of dispersing agents (a) and (b) were added to 10 g portions of this solution. Films were produced from the resulting solutions as described in Example 1. The adhesion of these films to glass was determined as described above under test method (C). The results of these experiments can be seen from the following Table 3.

TABLE 3

| Experiment No. | Dispersing agent | x | y | Adhesion of the film produced from the organic binder system to glass |
|---|---|---|---|---|
| 1 | (a) | 12 | 2 | slight |
| 2 | (a) | 12 | 7 | moderate |
| 3 | (a) | 25 | 7 | very slight |
| 4 | (a) | 30 | 4 | very slight |
| 5 | (b) | 15 | 7.5 | slight to moderate |
| 6 | (a) + (b) | (a) 30 (b) 15 | (a) 4 (b) 7.5 | very slight |

Comparison Example 3

Example 3 was repeated with the modification that the additives which are shown in Table (3a) and are customary for influencing dispersion were used instead of the dispersing agents (a) and (b) according to the invention. Testing was carried out analogously to Example 3. The experimental results can be seen from the following Table (3a).

TABLE 3a

| Experiment No. | Dispersing agent | Adhesion of the film produced from the organic binder system to glass |
|---|---|---|
| 1 | $\left[-CH_2-N\begin{matrix}(C_3H_6O)_5H\\(C_3H_6O)_5H\end{matrix}\right]_2$ | high |
| 2 | $C_{18}H_{37}N\begin{matrix}(C_2H_4O)_{7,5}H\\(C_2H_4O)_{7,5}H\end{matrix}$ | high |
| 3 | no dispersing agent added | very high |

Example 3 demonstrates the adhesion-reducing action of dispersing agents according to the invention in comparison with the comparison substances of Comparison Example 3 usually employed as dispersing agents.

Example 4

A solution of 4.5 parts by weight of polyvinylbutyral (composition as in Example (3), 0.5 part by weight of Menhaden fish oil, 1.7 parts by weight of dioctyl phthalate and 2.3 parts by weight of dibutyl phthalate in 30 parts by weight of toluene and 10 parts by weight of anhydrous ethanol was prepared. The solution was spread with a doctor blade onto a glass plate in a wet film thickness of 200 μm. The dried film adhered very firmly to the glass plate. In contrast, when 0.8 part by weight of the dispersing agent (a) of the formula I according to the invention, where x=30 and y=4 (cf. Table 1) was added to the same solution, the adhesion of a film produced in the same way to glass was slight.

Example 5

Two polymer solutions, both of polyvinylbutyral, trichloroethylene, ethanol and dioctyl phthalate, were prepared as described in Example 1. 1.7% by weight (based on the solution) of a random copolymer of ethylene oxide and propylene oxide having a molecular weight of 3,200 and 2.5% by weight of a fatty acid ester (Loxiol G 70 from Henkel) were added to one of the solutions in accordance with the state of the art (=experiment 1). The dispersing agent (b) of the formula II according to the invention, described in Table 1, where x=15 and y =7.5 was added to the second solution (=experiment 2) 3% by weight of finely divided aluminum oxide which had been dried by spraying from an aqueous slurry was also added to the two solutions Both solutions were ground in a bead mill for 20 hours.

Figure 2:
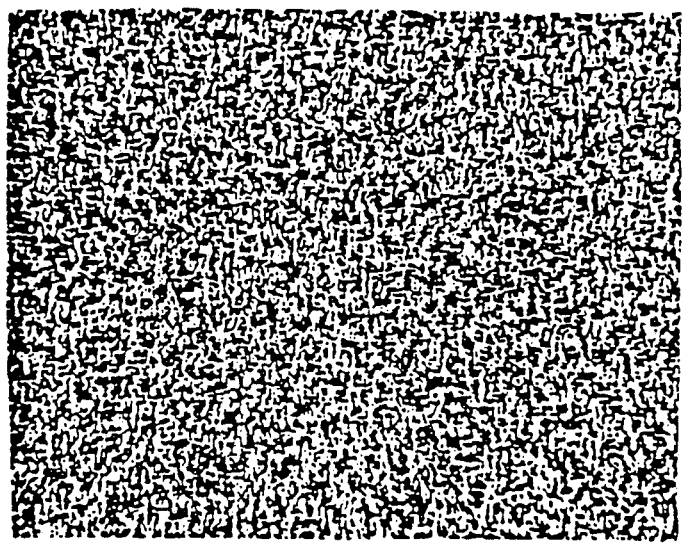

Finally, films were drawn on glass in a wet film thickness of 50 μm and examined under a microscope at a magnification of 200 FIG. 1 shows a film according to the state of the art (=experiment 1) with a very inhomogeneous distribution of the aluminum oxide particles in the binder film. The film produced according to the invention (=experiment 2) demonstrates, as FIG. 2 shows, the superior dispersing action of dispersing agents according to the invention, since it shows completely homogeneous distribution of the aluminum oxide particles in the binder film.

Example 6

100 parts by weight of aluminum oxide having an average particle size of 2 μm were ground in 24 parts by weight of trichloroethylene, 10 parts by weight of anhydrous ethanol and 0.8 part by weight of the dispersing agent (b) of the formula II according to the invention, described in Table 1, where x=15 and y=7.5, in a bead mill for 20 hours. 4 parts of polyvinylbutyral having a specification as described in Example 1 and 1.5 parts of dioctyl phthalate were then added and the mixture was ground for a further 6 hours The resulting slurry was cast onto a glass plate and dried, a flexible green film 0.6 mm thick being formed. The film was easy to peel off from the glass plate. After storage at 23° C. and 50% relative humidity for 3 days, the film had a tear strength of 2.1 N/mm$^2$ at an elongation at tear of 10.5% When Menhaden fish oil was used in this recipe instead of the dispersing agent (b) of the formula II according to the invention, the resulting film was to be peeled off from the glass only with difficulty. At a tear strength also of 2.1 N/mm$^2$, it moreover had an elongation at tear of only 7.6%.

Example 7

A green film which consisted of 100 parts by weight of aluminum oxide (average particle size 2 μm), 3.8 parts by weight of polyvinylbutyral (specification as described in Example 3), 1.5 parts by weight of DOP, 0.4 part by weight of the dispersing agent (a) of the formula I according to the invention, where x=30 and y=4, and 1.0 part by weight of the dispersing agent (b) of the formula II according to the invention, where x =15 and y =7.5 (cf Table 1), was produced by casting on a metal belt by the customary process. The film was easy to peel off from the belt. A substrate was produced from the green film by burning at 1,600° C. The shrinkage which arose during this procedure was 17.1% along the casting direction and 17.0% at right angles to the casting direction. When the dispersing agents (a) and (b) of the formulae I and II according to the invention were used were replaced by 0.4 part by weight of Menhaden fish oil and 1.0 part by weight of a random ethylene oxide/propylene oxide copolymer having a molecular weight of 4,000, the film resulting from this procedure adhered significantly more firmly to the casting belt. The shrinkage on burning to give the substrate was 19.2% (longitudinal) and 18.1% (at right angles). The smaller, more uniform and largely isotropic shrinkage of the film produced by the process according to the invention demonstrates the better dispersion in comparison with the comparison experiment according to the state of the art.

I claim:

1. A process for the production of a ceramic green film by casting and drying a slip containing finely divided inorganic pigment, organic solvents, polyvinylbutyral, plasticizer and dispersing agent, with comprises using compounds which contain in their molecules at least one structural unit of the formula

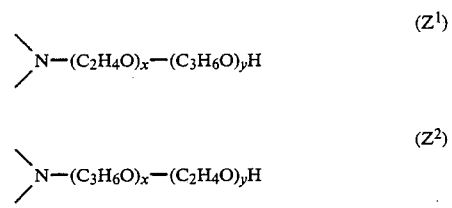

and x and y, which can be identical or different, each denote a number from 1 to 200, as dispersing agents.

2. A process as claimed in claim 1, wherein the dispersing agent contains compounds prepared by addition of one or more radicals of block copolymer structure of x ethylene oxide units and y propylene oxide units or x propylene oxide units and y ethylene oxide units, x and y in the radicals of block copolymer structure having the meanings as in formula $Z^1$ or $Z^2$, onto the amino groups of primary or secondary amines, having amino-N atoms substituted by aliphatic ($C_1$-$C_{18}$)- radicals, or of primary or primary/secondary or secondary di- or polyamines, having amino-N atoms substituted by aliphatic ($C_1$-$C_{18}$)-radicals or amino-N atoms bonded to one another by multivalent aliphatic ($C_1$-$C_{12}$)-radicals, the amines or di- or polyamines mentioned optionally contain tertiary- or quaternary-substituted N atoms and/or other substituents.

3. A process as claimed in claim 1, wherein the dispersing agent contains compounds which can be prepared by addition of four radicals of block copolymer structure of x ethylene oxide units and y propylene oxide units or x propylene oxide units and y ethylene oxide units, x and y in the radicals of block copolymer structure having the meanings as in formula $Z^1$ or $Z^2$ onto the amino groups of ethylenediamine.

4. A process as claimed in claim 1, wherein the dispersing agent is used in an amount of 0.1 to 10% by weight, based on the inorganic pigment.

5. A process as claimed in claim 1, wherein finely divided aluminum oxide is used as the inorganic pigment.

6. A process as claimed in claim 1, wherein the polyvinylbutyral used contains between 15 and 22% by weight of vinyl alcohol units.

* * * * *